United States Patent
Yamamoto

(12) 
(10) Patent No.: US 6,337,759 B1
(45) Date of Patent: Jan. 8, 2002

(54) POLARIZATION CONVERTER AND PROJECTION-TYPE DISPLAY DEVICE USING THE SAME

(75) Inventor: Chikara Yamamoto, Urawa (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/583,289

(22) Filed: May 31, 2000

(30) Foreign Application Priority Data

Jun. 25, 1999 (JP) .......................................... 11-180073

(51) Int. Cl.⁷ .................. G02F 1/153; G02B 27/10; G02B 5/30; G02B 27/38
(52) U.S. Cl. .................. 359/267; 359/621; 359/496; 359/497
(58) Field of Search ................................ 359/621, 625, 359/267, 496, 497, 129, 618; 353/131, 34, 37

(56) References Cited

U.S. PATENT DOCUMENTS 5,757,547 A * 5/1998 Rodman et al. ............ 359/497
5,986,809 A   11/1999 Itoh et al.

FOREIGN PATENT DOCUMENTS

JP    H8-304739    11/1996

* cited by examiner

*Primary Examiner*—Georgia Epps
*Assistant Examiner*—Michael A. Lucas
(74) *Attorney, Agent, or Firm*—Arnold International; Bruce Y. Arnold

(57) ABSTRACT

A polarization converter, and a projection-type display device using the same, is disclosed having two or more comb polarization-separation prism arrays that are arranged, with regard to the alignment of alternating polarizing beam splitter films and reflection films on adjacent prism surfaces, in rows that are non-parallel to one another. Each comb polarization-separation prism array is formed by adjacent prisms arranged in a row such that each adjacent prism has, on one surface thereof, either a polarizing beam-splitter film or a reflection film, with these films being arranged alternately in said row. Preferable, the angle between the rows of the two or more comb polarization-separation prism arrays is substantially 90 degrees. Such an arrangement enables the polarization converter to more efficiently utilize the light that is incident non-uniformly on regions of lenticular lens array elements of the output surface of a light integrator that is used in conjunction with the polarization converter in order to provide a uniform, bright image to a projection-type display device which uses the polarization converter.

9 Claims, 8 Drawing Sheets

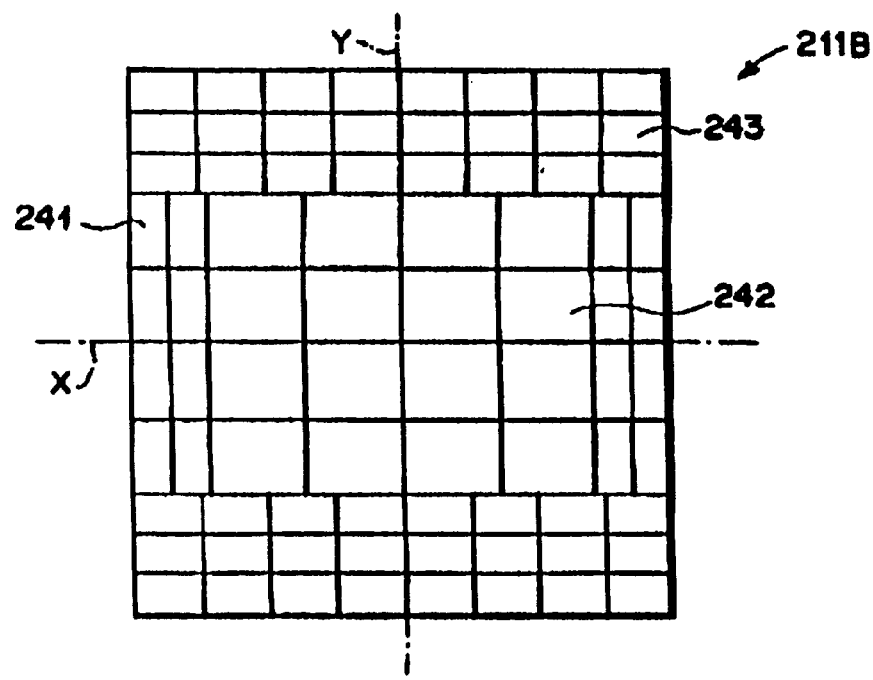
Fig. 6
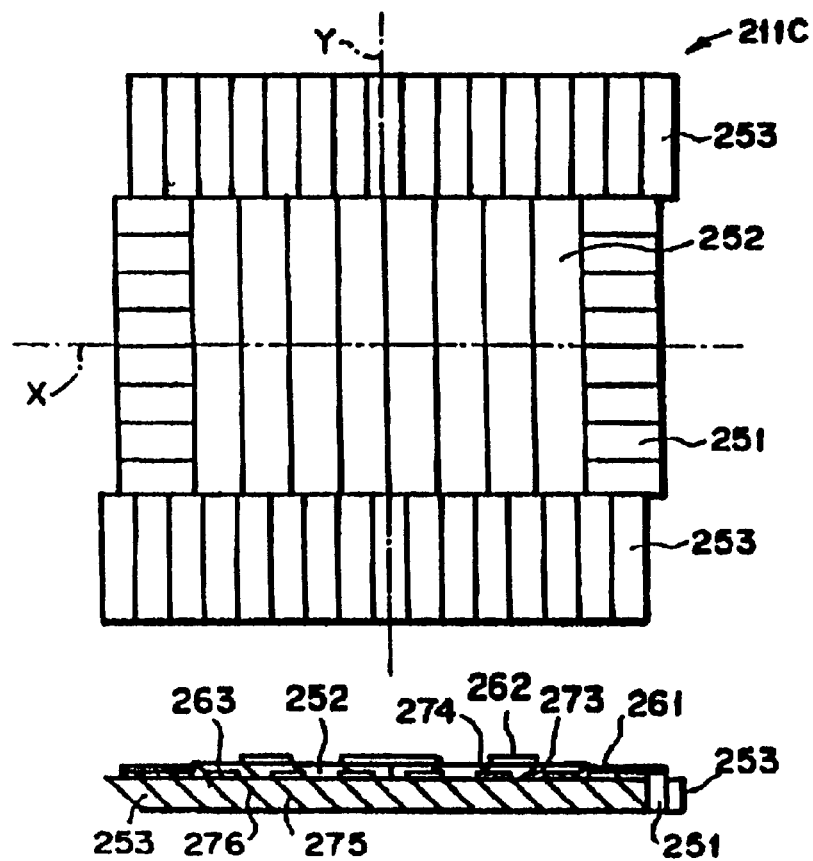
Fig. 7(A)
Fig. 7(B)

POLARIZATION CONVERTER AND PROJECTION-TYPE DISPLAY DEVICE USING THE SAME

CROSS-REFERENCE TO RELATED APPLICATION

This application is related in subject matter to applicant's U.S. application Ser. No. 09/548,628, filed Apr. 13, 2000, and entitled "Illuminating Optical System and Projector-Type Display Unit That Uses It".

BACKGROUND OF THE INVENTION

Unevenness due to the light distribution characteristics of a light source may be reduced in an illuminating optical system, such as a liquid crystal projector, even if a light source having an irregular light distribution, such as a metal halide lamp, a xenon lamp, a halogen lamp, or the like, is used. A system called a light integrator is known that uses one or more lenticular lens arrays arranged in the light path in order to make the light more even.

FIGS. 10(A) and 11(A) are sectional views of portions (namely, from a light source to a polarization converter), of prior art illuminating optical systems. FIGS. 10(B) and 11(B) are views of the components shown in FIGS. 10(A) and 11(A), respectively, as seen from the light modulator side of a projection-type display device.

More specifically, the prior art illuminating optical systems of FIGS. 10(A) and 11(A) each includes a light source 910 formed of a lamp 904 and a reflector 901, a first integrator plate 911A (formed of a first lenticular lens array), a second integrator plate 911B (formed of a second lenticular lens array), a polarization converter 911C and a field lens (not shown), listed in the order that light progresses through the system. The first integrator plate 911A is configured by arranging a plurality of lens elements into a two-dimensional array to form a lenticular lens. Similarly, the second integrator plate 911B is configured by arranging a plurality of lens elements into a two-dimensional array to form a lenticular lens. The first integrator plate 911A divides the single beam from the reflector 901, which single beam has a large spatial unevenness of luminosity, into multiple divided light beams, with the number of divided beams being the same as the number of lens elements in the first integrator plate 911A. The spatial variation of the luminous flux in the divided beams is smaller than the spatial variation of the single luminous flux before the division. Each divided beam is then incident onto a respective region of the second integrator plate 911B. The second integrator plate and a field lens operate to direct each divided light beam so that all divided light beams overlap one another at an illuminated area, thereby achieving an even illumination in the illuminated area.

Moreover, each member is arranged within an optical system so that the second integrator plate 911B and the pupil of a projection lens are at conjugate positions of the optical system and so that the lamp(s) 904 and the first integrator plate 911A are at conjugate positions of the optical system, thus providing a projection-type display device wherein the second integrator plate serves as a secondary light source. If the light modulator is formed using a liquid crystal light modulator, a liquid-crystal projection-t ype display is thus provided.

The prior art polarization converter 911C is arranged, relative to the first integrator plate and the second integrator plate, nearer the second integrator plate 911B. Images of the light source are formed on the second integrator plate, and the polarization converter efficiently converts the unpolarized light from the light source into linearly polarized light having a single polarization direction. Such a polarization converter is disclosed in U.S. Pat. No. 5,986,809 and includes pairs of prisms with each prism supporting a polarizing beam splitter film 971 or a reflection film 972 inclined at an angle relative to an optical axis (FIGS. 10(A) and 11(A)). These films are alternately arranged in a row across the light beam. Thus, there are alternately arranged across the light beam polarizing beam splitter surfaces and reflecting surfaces. Such a structure is herein termed a "comb polarization-separation prism array". Further, half-wave phase retardation plates 963 (hereinafter termed half-wave plates) are arranged on every surface from which the polarized light exits from the comb polarization-separation prism array (i.e., in those light paths of either the transmitted p-polarized component or the reflected s-polarized component so as to rotate the polarization of one of these components 90 degrees, thereby converting the unpolarized light incident on the polarization converter into light exiting the polarization converter that is uniformly polarized.) In FIGS. 10 and 11, half-wave plates 963 are arranged only on those surfaces where the p-polarized light exits the comb polarization-separation prism array. Of course, alternatively, the half-wave plates 963 could be arranged instead on those surfaces where the s-polarized light exits the comb polarization-separation prism array.

Japanese Laid-open Patent Application 8-304739 uses an integrator plate having such a lens array, so that the unevenness of illumination onto a light modulator is reduced. Further, the illumination optical system is compact and provides a bright image. By combining an integrator plate and a polarization converter in such a manner, unpolarized light emitted from a light source may be illuminated onto an illuminating area as light having a single polarization without any significant loss of light. Thus, the light from a light source is efficiently used.

Moreover, a light source, a polarization converter and other members are arranged so as to locate an image of the light source(s) near the polarization-separation film of the polarization converter. Thus, even when the unpolarized light from the light source is split into p-component and s-component light fluxes, the luminous flux is not widened and a compact optical system may be provided.

When the shapes of the light source images formed on the second integrator plate are significantly different (depending on the locations of lens array elements, such as near the optical axis versus at the periphery of the array) light is often wasted. Sections having low illumination efficiency may be formed in a polarization converter having polarizing beam splitter films and reflection films arranged only in one direction.

Additionally, when the shapes of each lens array element of the second integrator plate are different and, particularly, when each lens array element is arranged with a relatively fine pitch in the same direction as the arrangement direction of the polarizing beam splitter films and reflection films, a polarization converter has to have its polarizing beam splitter films and reflection films arranged with a correspondingly fine pitch. This is required in order to provide a high illumination efficiency and for compactness.

An illuminating optical system is disclosed in Japanese Laid-open Patent Application 11-108909 by the present applicant. This illuminating optical system uses a plurality of light sources and has a large spatial variation of luminosity among the light sources. Thus, the shapes of the lens array elements of the second integrator plate differ. However, even with a single light source, the luminous flux has a large spatial variation so that the shapes of the lens array elements of the second integrator often differ.

BRIEF SUMMARY OF THE INVENTION

The present invention provides a polarization converter which has a simple structure that can convert unpolarized light to polarized light having a uniform direction of polarization even when the shapes of light source images formed on a second integrator plate are significantly different from each other, due to the location of lens array elements, and even when the shapes of the lens array elements of the second integrator plate differ. The present invention also provides the above-described polarization converter in combination with a projection-type display device.

The polarization converter of the present invention has at least two regions, with each region including adjacent prisms arranged side-by-side in a row. The prisms support films along the row that are arranged in pairs, each film pair including a polarizing beam splitter film and a reflection film. The row of adjacent prisms in one region is oriented non-parallel to the row of adjacent prisms of another region, and the polarization converter further includes a half-wave plate arranged on an exit surface of every other prism in a given row. Thus, in each region, prisms are arranged as in prior art polarization converters, namely, side-by-side in a row, with adjacent prism surfaces having alternating films applied thereto and arranged in pairs. As in prior art polarization converters, the alternating films arranged in pairs are a polarizing beam splitter film, that reflects only the s-component of incident light, and a reflecting film, that redirects the reflected s-component in the direction of the p-component light transmitted by the polarizing beam splitter film. As in the prior art, half-wave plates are arranged on alternate exit surfaces of the adjacent prism pairs so as to rotate the polarization of the s-component light 90 degrees and thereby convert the light exiting the half-wave plates into p-component light. Alternatively, the half-wave plates can be arranged on different, alternate exit surfaces of the adjacent prism pairs so as to rotate the polarization of the p-component light into s-component light. In each case, just as in the prior art, the polarization converter efficiently converts unpolarized light into light that is linearly polarized in a uniform direction.

The present invention differs from the prior art by having the row direction of one region of the at least two regions be non-parallel to the row direction of another region. Preferably, the row directions differ by an angle of substantially 90 degrees. In addition to the row directions being different among at least two regions, the pitch of the array of prisms in one region will, in general, be different than the pitch of the array of prisms of another region. Further, having the pitch of the adjacent prisms in one region be different from the pitch of adjacent prisms in another region results in the height of the at least two regions of the polarization converter being different, as measured in the direction that light is incident onto the polarization converter.

Also, a projection-type display device of the present invention includes a light source section (wherein a single lamp or a plurality of lamps is arranged); an integrator section having at least one integrator plate wherein a plurality of lens array elements are arranged so as to provide an even illumination; a light modulator which modulates the light emitted from the integrator section in response to predetermined image information, and a projection lens which projects optical images, using the light modulated by the light modulator, onto a screen. The polarization converter mentioned above is arranged near the integrator plate which is closest to the light modulator. Depending on the configuration of the light source and the integrator section, the polarizing beam splitting films and reflection films of the polarization converter may need to have an extremely fine configuration in certain regions but not in other regions. The present invention enables this to be accomplished while taking into consideration cost of manufacture and the precision of assembly needed for a particular design of the polarization converter.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 6 shows the configuration of the second lenticular lens array of Embodiment 2, FIGS. 7(A) and 7(B) are top and side views, respectively, of the polarization converter of Embodiment 2.

DETAILED DESCRIPTION

The present invention relates to a polarization converter suitable for an illuminating optical system such as a liquid crystal projector or the like wherein a light modulator modulates light in response to predetermined image information of a projection-type display device. More specifically, the present invention relates to a polarization converter that is arranged between a light source and a light modulator so as to polarize the luminous fluxes emitted from a light source into a predetermined uniform direction.

The present invention will first be explained in general terms by referring to the figures of a polarization converter relating to Embodiment 1.

Figure 1A:
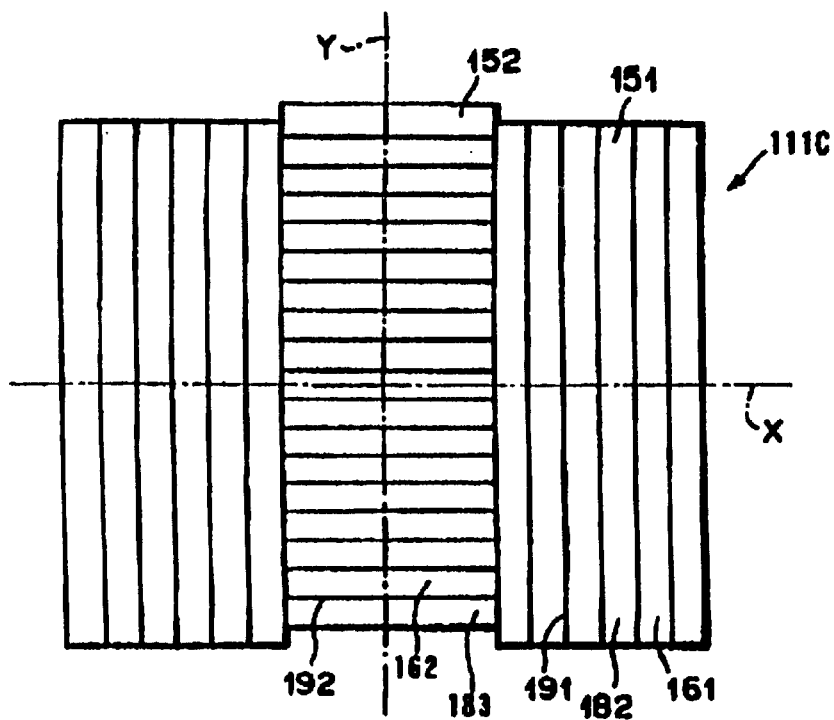
FIGS. 1(A) and 1(B) are top and side views, respectively, of the polarization converter of Embodiment 1.
Figure 1B:
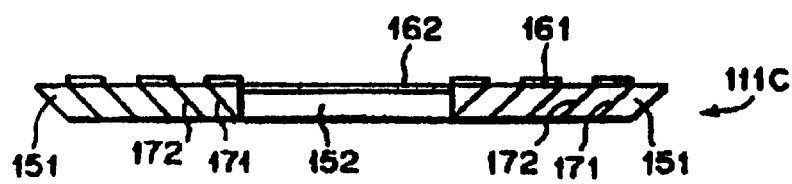
Figure 2:
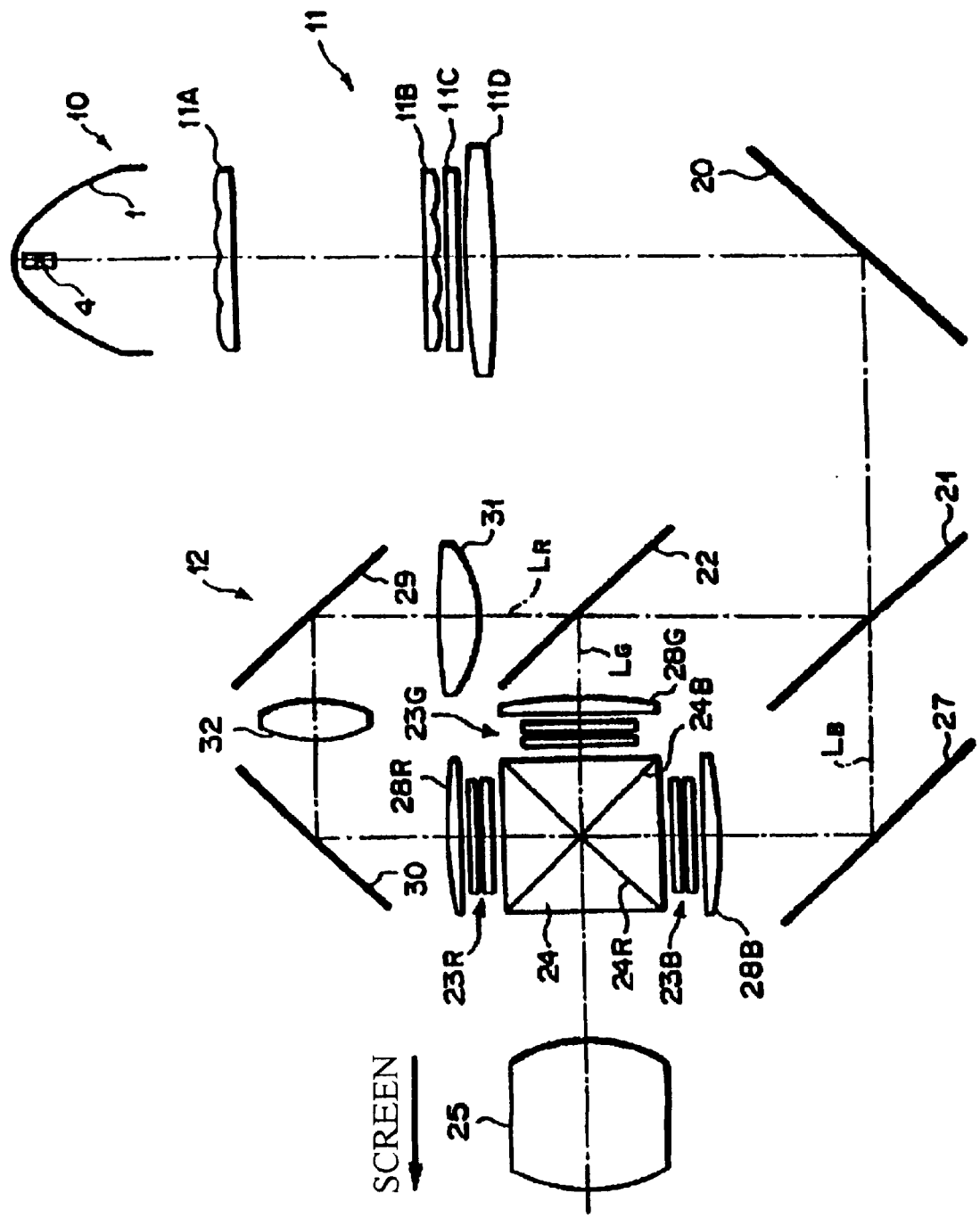
FIG. 2 shows the combination of a polarization converter according to the present invention in combination with a projection-type display device that uses it.

FIGS. 1(A) and 1(B) show views of a configuration of the polarization converter relating to Embodiment 1, and FIG. 2 is a view showing a configuration of a projection-type display device having a polarization converter according to the present invention.

As shown in FIG. 2, this projection-type display device includes a light source section 10, an integrator section 11 to combine the luminous fluxes emitted from this light source section 10 and then provide a uniform quantity distribution of light, and a projection section 12 so as to support image information on the luminous fluxes, which became uniform at the integrator section 11, and then to project the light onto a screen.

FIG. 2 is intended to illustrate the generalized configuration for all embodiments of the invention. The light source section 10, as illustrated in FIG. 2, consists of a lamp 4, which has a discharge tube such as a xenon lamp or a metal halide lamp and emits unpolarized light, and a reflector 1 such as a parabolic mirror. This reflector 1 has the lamp 4 at its focal position so as to redirect light that is incident thereon into a light beam that is roughly parallel to the optical axis. When plural light sources are used, each lamp is at the focal point of an associated reflector. As used herein, light source section 10 may refer to a single or plural light sources.

The integrator section 11 includes a first lenticular lens array 11A for dividing the luminous flux from the light source section 10, a second lenticular lens array 11B so as to superpose the light spots, formed by each luminous flux from the first lenticular lens array 11A, onto a liquid crystal panel which will be later described, a polarization converter 11C which converts the unpolarized light from the light source into a luminous flux having a uniform direction of polarization, and a convex field lens 11D. Additionally, the first lenticular lens array 11A is made of a plurality of lens array elements arranged two-dimensionally. Each lens array element has a boundary which roughly corresponds in shape to that of the liquid crystal panel, mentioned later. Similarly, the second lenticular lens array 11B is also made of a plurality of lens array elements arranged two-dimensionally. More specifically, an image of the light source section 10 is formed by each lens array element of the second lenticular lens array 11B.

On the other hand, the projection section 12 includes: a dichroic mirror 21 for B/GR separation so as to separate the luminous flux, which was made spatially even by the integrator section 11, into a blue component $L_B$, and combined green and red components; a dichroic mirror 22 so as to separate the combined green and red components into a green component $L_G$ and a red component $L_R$; a liquid crystal panel 23B (which is sandwiched between a pair of polarizing plates and is the same as liquid crystal panels 23G and 23R) so as to display images of the blue component; a liquid crystal panel 23G so as to display images of the green component; a liquid crystal panel 23R so as to display images of the red component; a three-color synthesizing prism 24 so as to synthesize the luminous flux components $L_B$, $L_G$ and $L_R$, to which image information was added by each liquid crystal panel 23B, 23G and 23R, respectively; and a projection lens 25 which forms an image of the luminous flux that has been combined by the three-color synthesizing prism 24 onto a screen. Additionally included are: a total reflecting mirror 27 so as to reflect the blue component $L_B$ towards the liquid crystal panel 23B; a field lens 28B so as to make the blue component reflected by the total reflecting mirror 27 into parallel rays; a field lens 28G so as to make the green component $L_G$ into parallel rays; total reflecting mirrors 29 and 30 so as to reflect the red component towards the liquid crystal panel 23R; and a field lens 28R so as to make the red component $L_R$ into parallel rays.

Moreover, in the projection section 12, the optical path to the three-color synthesizing prism 24 is different only for the red component $L_R$. However, a field lens 31 and a relay lens 32 are arranged between the dichroic mirror 22 and the total reflecting mirror 29 and between the total reflecting mirror 29 and the total reflecting mirror 30, respectively. By these field lens 31 and relay lens 32, the red component $L_R$ is corrected so as to make the optical path appear the same as that of the blue component $L_B$ and the green component $L_G$. In addition, the three-color synthesizing prism 24 is a cross prism, and has a dichroic surface 24B to reflect the blue component $L_B$ and a dichroic surface 24R to reflect the red component $L_R$.

Furthermore, a total reflecting mirror 20 is arranged so as to fold the optical path in the direction of the projection section 12.

As described in this embodiment, the luminous fluxes, which were made to have a spatially even distribution by means of the first lenticular lens array 11A and the second lenticular lens array 11B, are separated into p-polarization components and s-polarization components on the projection section 12 side of the second lenticular lens array 11B. One of these polarization components is then converted to the other component by means of using half-wave plates so that the output light from the polarization converter has a uniform polarization. In this manner polarizing beam splitter films and reflection films are used to efficiently convert the unpolarized light to light having a uniform polarization, thus limiting the decrease in quantity of light in the process of linearly polarizing it.

FIGS. 1 shows a typical example of the polarization converter 11C of FIG. 2. Because FIG. 1 depicts Embodiment 1, item "11C" has been renumbered—111C—. A similar numbering format applies to FIGS. 3, 4, and 6–11, wherein the first digit "2" indicates the second embodiment, the first digit "3" indicates the third embodiment, and the first digit "9" indicates a prior art component. Thus, FIG. 1(A) illustrates the polarization converter 111C (i.e., Embodiment 1, item 11C) as viewed from a position along the optical axis by an observer on the projection section 12 side relative to the polarization converter. FIG. 1(B) depicts the same item as FIG. 1A, but as viewed by an observer having his eye in the plane of the drawing at the bottom of the drawing page.

As illustrated in FIG. 1(B), polarization converter 111C includes comb polarization-separation prism arrays 151 and 152 having different thicknesses in the direction of the optical axis with half-wave plates 161 and 162 arranged on the side of every other exit surface of the comb polarization-separation prism arrays 151 and 152. The different thicknesses are a result of the prism arrays 151 and 152 having a different pitch.

As illustrated in FIGS. 1(A) and 1(B), the comb polarization-separation prism arrays 151 are formed by arranging adjacent prisms in a row that is parallel to the X-axis. A first prism has a polarizing beam splitter film (e.g., multiple coatings) 171 that transmits p-polarized light and reflects s-polarized light formed on a surface thereof. A second prism is positioned immediately adjacent the first prism and has a reflection surface or film 172 on a surface thereof that reflects the once reflected light once more so as to propagate in the same direction as the p-polarized light that was transmitted by the polarizing beam splitter film 171. Thus, the prism arrays have a comb shape. Half-wave plates 161 are arranged on the exit surface of every other prism.

Additionally, the comb polarization-separation prism array 152, which is located between the two comb polarization-separation prism arrays 151, is formed by arranging adjacent prisms in a row that is substantially parallel to the Y-axis. Other than the row directions in which the prisms are arranged, which corresponds to the row directions in which the alternating polarizing beam splitter films and reflecting films are arranged, comb polarization-separation prism array 152 has roughly the same configuration as the comb polarization-separation prism arrays 151. However, the width and thickness of the prism pairs are different. More specifically, the comb polarization-separation prism array 152 is formed by arranging, in a row that is substantially aligned with the Y-axis, a plurality of adjacent prism pairs that consist of a first prism 183, which supports a polarizing beam splitter film (not shown in the figure), and a second prism, which supports a reflection film (not shown in the figure). Once again, half-wave plates 162 are arranged on every other prism exit surface (e.g., the exit surfaces of light transmitted by the beam splitter films). Alternatively, the half-wave plates 161 and 162 can be arranged on prism exit surfaces that transmit the polarized light which is reflected by the reflection film.

The polarization converter of the present invention, in the preferred embodiments illustrated, includes a member having two comb polarization-separation prism arrays that are substantially orthogonal to each other with regard to the alignment of alternating polarizing beam splitter films and reflection films on adjacent prism surfaces, each comb polarization-separation prism array being formed by adjacent prisms arranged in a row such that each adjacent prism has on one surface thereof either a polarizing beam-splitter film or a reflection film, with these films being arranged alternately in the row. Specifically, this configuration is shown in FIG. 1(A) wherein prism boundary 191 of the comb polarization-separation prism arrays 151 and a prism boundary 192 of the comb polarization-separation prism array 152 are substantially perpendicular to each other.

In this configuration, all the luminous fluxes emitted from the polarization converter 11C, such as the luminous fluxes emitted by the comb polarization-separation prism arrays 151 and 152, are polarized with a single, predetermined direction of polarization.

Figure 4:
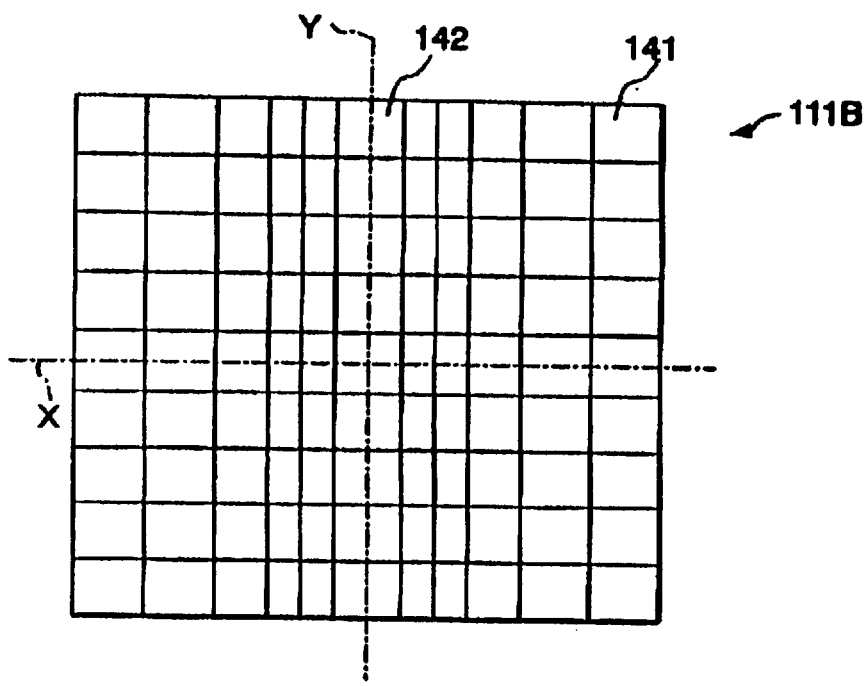
FIG. 4 shows the configuration of the second lenticular lens array of Embodiment 1.

The polarization converter 11C is configured with a shape that roughly corresponds to the array regions of the second lenticular lens array 11B. For example, the polarization converter 111C of FIG. 1 has comb polarization-separation prism arrays 151, 152, that correspond in shape to the shape of the second lenticular lens array regions 141 and 142 as illustrated in FIG. 4, wherein the row directions vary depending on the pitch of the lens elements in the second lenticular lens array 111B.

In the first lenticular lens array 11A (FIG. 2), the lens array elements have shapes that roughly correspond to the shape of the liquid crystal panels 23B, 23G and 23R. In the second lenticular lens array 111B, each lens array element 142 in the central region near the Y-axis has a rectangular shape which is longer in the Y-axis direction. On the other hand, each lens array element 141 (on the left and right margins) has a rectangular shape which is longer in the X-axis direction. Additionally, each lens array element 142 near the Y-axis has a smaller pitch in the X-axis direction than the pitch of each lens array element 141 (on the left and right margins).

As shown in FIG. 1(A), the comb polarization-separation prism array 152, wherein prism pairs are arranged in the Y-axis direction, is arranged to receive light from array elements of the second lenticular lens array having a pitch such that the width of the array elements in the X-axis direction is relatively small. And, the comb polarization-separation prism arrays 151, wherein prism pairs are arranged in the X-axis direction, are arranged to receive light from array elements of the second lenticular lens array having a pitch such that the width of the array elements in the X-axis direction is relatively large. Therefore, the regions where the polarizing beam splitter films and reflection films of the comb polarization-separation prism arrays 151 and 152 are alternately arranged in a given direction match the regions formed by the lens array elements 141 and 142, respectively, of the second lenticular lens array 111B.

The effects obtained by using the polarization converter 11C (FIG. 2) having such a configuration will now be described. The polarization converter 11C is located near the exit surface of the second lenticular lens array 11B. Due to this configuration, out of the total quantity of light emitted from one corresponding lens array element in the second lenticular lens array 11B, only the light flux incident on one-half the area of a lens array element may be passed on to the polarization converter. This is because only the quantity of light that entered the first prism, having the polarizing beam splitter film therein, out of two prisms of a prism pair of the polarization converter is utilized to receive light directly from the lens array element. Thus, in order to improve the efficiency of utilizing light, it is necessary to have light enter the polarization converter 11C from a region of the exit area of the lens array element of the second integrator that passes the largest quantity of light due to the shape of the light source image on the second integrator. In other words, the lens array elements of the second lenticular lens array 11B should be configured so as to increase the quantity of light emitted from those regions, from among the exit areas of the lens array elements of the second lenticular lens array, which can be most useful in the polarization converter 11C.

Light is not uniformly incident onto the surface of the lens array elements of the second lenticular lens array 11B. In fact, there are regions where a larger quantity of light is incident and regions where a smaller quantity of light is incident. Thus, it is important to know from which half-section of the exit surface of a lens array element the larger quantity of light is incident.

Figure 5A:
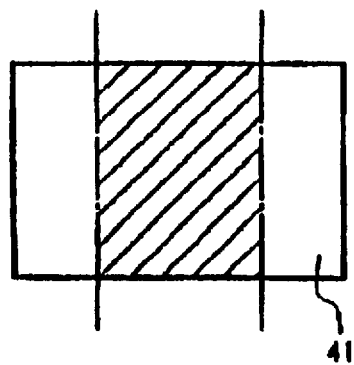
FIGS. 5(A) and 5(B) are examples of dividing an area of a polarization converter according to the configuration of lens array elements of the second lenticular lens array.
Figure 5B:
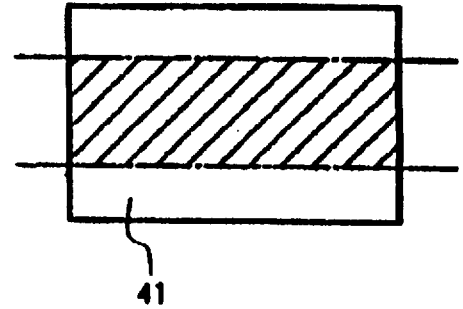

FIGS. 5(A) and 5(B) show two ways of dividing one of the lens array elements constituting the second lenticular lens array 11B into regions (shaded versus unshaded) that have equal areas. For example, when the lens array element has a horizontally long rectangular shape, as does the lens array elements 41 in FIGS. 5(A) and (B), the region can be divided into shaded and unshaded areas as shown in FIG. 5(A) or as shown in FIG. 5(B). In bath cases, the areas of the shaded region is identical to the area of the unshaded region.

In the case where a large quantity of light is incident at a region that corresponds to the horizontal center of this lens array element 41, it would be most effective to use the luminous flux from a long rectangular region centered about the Y-axis, as illustrated by the shaded region shown in FIG. 5(A). Additionally, when the lamp 4 has a high illumination only within a small region, as is the case when an arc discharge-type lamp is used, the area having the largest quantity of incident light will be almost circular, assuming the light is incident onto a surface which is orthogonal to the optical axis. In comparing FIGS. 5(A) and 5(B), clearly FIG. 5(A) has the larger ratio of shaded area relative to the area of a circumscribing circle. Thus, if the area is divided as in FIG. 5(A), the display image will be brighter.

Based on these reasons, where the pitch in the X-axis direction of each lens array element 142 near the Y-axis is smaller than the pitch in the X-axis direction of each lens array element 141 remote from the Y-axis, the size and arrangement of each comb polarization-separation prism array 151 and 152 of the polarization converter 111C should be set as shown in FIG. 1(A), so that the luminous transmission efficiency of the polarization converter 111C is maximized, thereby providing images projected onto a screen that are bright.

In the case where the shapes of the lens array elements 141 and 142 are different from each other, as is true for the second lenticular lens array 111B shown in FIG. 4, the light from each lens array element 142 near the Y-axis cannot be effectively used by a polarization converter that has comb polarization-separation prism arrays that are aligned in only one direction, as is the case with conventional polarization converters. However, the present inventor has observed that, if comb polarization-separation prism arrays of different pitches are arranged in different rows, wherein the rows preferably form an angle of substantially 90 degrees, the illumination efficiency is improved.

Considering illumination efficiency, the most effective polarization converter would be one the corresponds in shape to the shape of the portion of the lens array elements of the second lenticular lens array which receive the light source image of each lens array element. However, the cost of manufacture would increase and the efficiency would decrease due to the assembly precision required.

According to the present invention, a polarization converter is configured so that two or more comb polarization-separation prism array regions are arranged, with regard to the alignment of alternating polarizing beam splitter films and reflection films on adjacent prism surfaces, in rows that are non-parallel. Preferably, the rows form an angle of substantially 90 degrees. Each comb polarization-separation prism array is formed by adjacent prisms arranged in a row such that each adjacent prism has on one surface thereof a film that is either a polarizing beam-splitter film or a reflection film, with these films being arranged alternately in a given row. Therefore, a polarization converter may be obtained that has superior efficiency in utilizing light than a polarization converter in which two or more comb polarization-separation prism arrays are arranged in rows that are substantially parallel.

Further, such a design provides a polarization converter that is easy to manufacture and does not require excessive precision of manufacture. The polarization converter of the present invention is particularly effective when the lamp(s) of the light source emits light from a finite area rather than from a point. Thus, the polarization converter of the present invention can produce a projection-type display device that is less costly and has a brighter image than those using the prior art polarization converters.

Three specific embodiments of the present invention will now be explained in detail.

Embodiment 1

Figure 3:
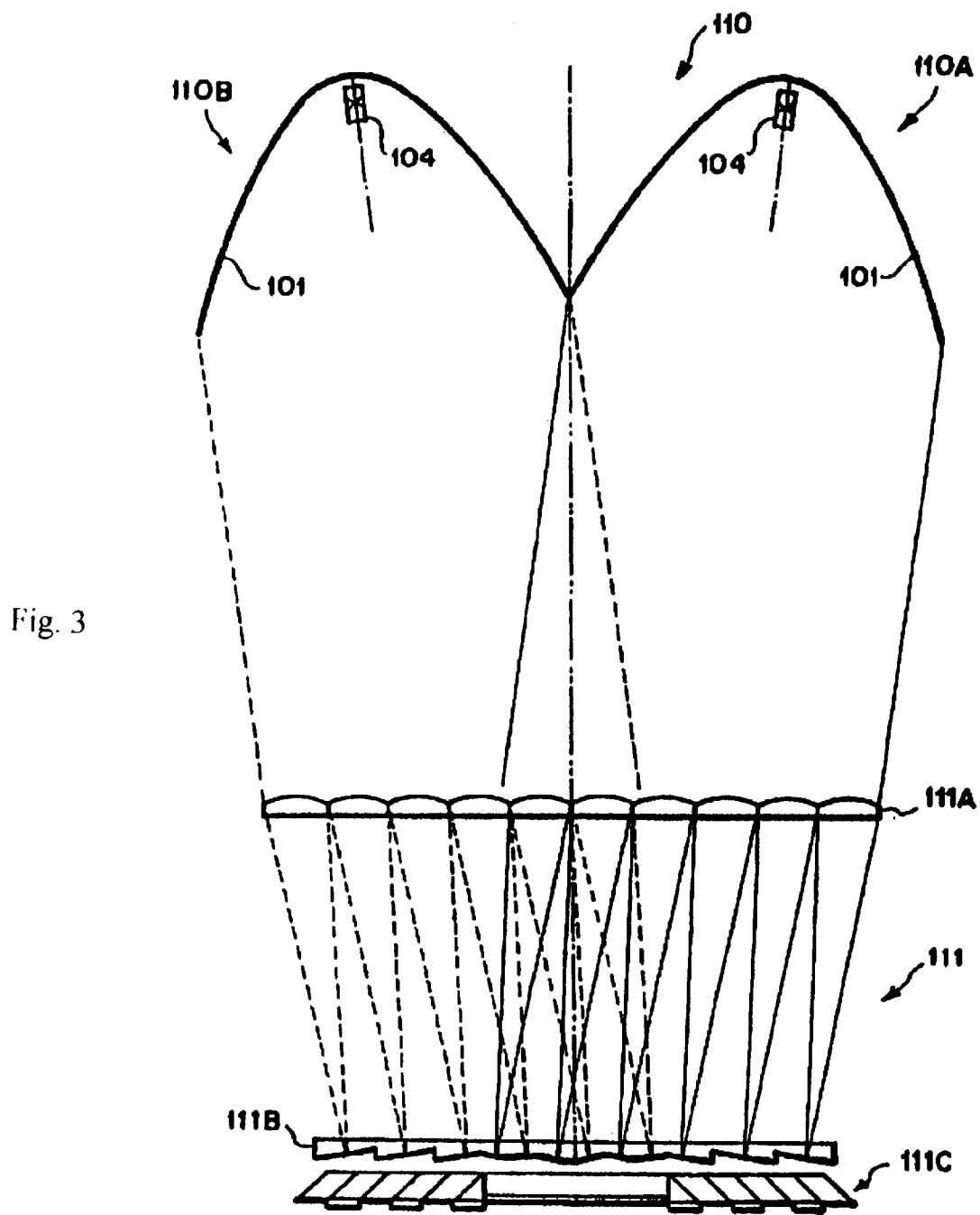
FIG. 3 shows a configuration, from a light source section to the polarizing beam splitter, of Embodiment 1 of the present invention.

In Embodiment 1 (FIG. 3), for the light source section 110, two light source sections 110A and 110B, each formed of an lamp 104 and a parabolic reflector 101 (as described above), are arranged symmetrically relative to the optical axis and are inclined to face inward toward each other so that the light beams from each lamp at least partially overlap. FIG. 3 shows the configuration from the light source sections to the polarization converter of this projection-type display device.

In addition to the description above, the correlation among the light source section 110, the second lenticular lens array 111B and the polarization converter 111C of this projection-type type display device will be described.

As illustrated in FIG. 3, the luminous fluxes from the two light source sections 110A and 110B overlap in a central region of first lenticular lens array 111A of an integrator section 111. Specifically, per lens array element near the optical axis of the first lenticular lens array 111A, the light fluxes from the right and left light source sections 110A and 110B overlap. Thus, even on the following second lenticular lens array 111B, portions of the luminous fluxes from the light source sections 110A and 110B overlap. Accordingly, as shown in FIGS. 3 and 4, near the Y-axis of the second lenticular lens array 111B the light fluxes from the right and left light source sections overlap, thus the overlapping region near the Y-axis receives roughly twice the light per unit area as the regions remote from the Y-axis.

If the second lenticular lens array 111B were to have lens array elements all of the same shape as the first lenticular lens array 111A and the lens array elements at the second lenticular lens array 111B were to mutually correspond to the lens array elements of the first lenticular lens array 111A, the partially overlapping light source images would be formed at right and left locations per element for the lens array elements near the Y-axis of the second lenticular lens array 111B. Thus, in order to efficiently utilize the light near the Y-axis, the pitch in the X-axis direction (in the direction of arranging the light source sections) of each lens array element 142 near the Y-axis is made smaller than the pitch in the X-axis direction of each lens array element 141 that is remote from the Y-axis. In other words, as shown in FIG. 4, the lens array elements 142 near the Y-axis are made to have a width in the X-axis direction that is half the width of the lens array elements 141 that are remote from the Y-axis. This results in only one light source image now being formed per lens array element shown in FIG. 4. This enables the bright spot at the center of each light source image to be used to the maximum in order to maximize light utilization efficiency and provide a bright display image.

Additionally, each lens array element 142 near the Y-axis has a rectangular shape which is longer in the Y-axis direction than in the X-axis direction. On the other hand, each lens array element 141 remote from the Y-axis has a rectangular shape which is longer in the X-axis direction than in the Y-axis direction. Accordingly, the second lenticular lens array 111B has a configuration which can use the light from the light source section 110 efficiently. Moreover, by using a polarization converter 111C as shown in FIG. 1, illumination efficiency can be improved.

More specifically, for this polarization converter 111C, as explained in the above description, two types of comb polarization-separation prism arrays 151 and 152 are utilized, as shown in FIG. 1(A). The luminous flux from each lens array element 142 (FIG. 4) near the Y-axis enters the comb polarization-separation array 152 (FIG. 1(A)) wherein prism pairs are arranged in the Y-axis direction (i.e.

in a direction orthogonal to the direction of arranging the light source sections). On the other hand, the luminous flux from each lens array element 141 enters the comb polarization-separation arrays 151 where prism pairs are arranged on both sides (i.e, in the X-axis direction) of the comb polarization-separation array 152 (i.e., in the direction of arranging the light source sections).

Subsequently, the luminous flux entering the polarization converter 111C is split at the comb polarization-separation prism array 151 into: p-polarized light, which is transmitted by the polarizing beam splitter films 171 and then rotated in polarization direction by half-wave plate 161; and s-polarized light, which is reflected by the polarizing beam splitter films 171, and then reflected again by the reflection films 172. Additionally, the luminous flux is split at the comb polarization-separation prism array 152 into p-polarized light which is transmitted by the polarizing beam splitter films (not shown)and is then rotated in polarization direction by half-wave plates 162, and s-polarized light which is reflected by the polarizing beam splitter films (not shown) toward the top of the page in FIG. 1(A), and reflected again by reflection films (not shown). In this way, a single polarization of light is emitted by the polarization converter, and the polarization converter includes regions 151 and 152 wherein the adjacent comb polarization-separation prisms with supported films are oriented parallel to one another within a given region but the orientation among the different regions 151 and 152 is different. Preferably, the row direction of the comb polarization-separation prism array in region 151 is substantially orthogonal to the row direction of the comb polarization-separation prism array in region 152.

Additionally, as shown in FIG. 1(A), the prism pairs of the comb polarization-separation prism array 152 have a higher pitch than the prism pairs of the comb polarization-separation prism arrays 151. Since the pitch (defined as the number per unit length) and width of these prism pairs are inversely proportional to each other (as a result of them be adjacently arranged abutting one another in the width dimension), the result is that the height of the prisms pairs (as best seen in FIG. 1(B)) in the optical axis direction of the comb polarization-separation prism array 152 is made less than the height of the comb polarization-separation prism arrays 151.

In the polarization converter 111C relating to this embodiment, the row direction of the adjacent comb polarization-separation prisms 151, and the row direction of the adjacent comb polarization-separation prisms 152, are roughly orthogonal to each other. Thus, in the projection-type display device of Embodiment 1 having two light source sections 110A and 110B, and in the second lenticular lens array 111B corresponding thereto, the efficiency of utilizing light is excellent, and the cost of assembly is low.

Additionally, the light source section 110 includes the two lamps 104 and the reflectors 101 in Embodiment 1. The number of lamps at the light source section can be more than two. Furthermore, luminous fluxes emitted from the light source section 110 may or may not partially overlap each other where the luminous fluxes from the light source section 110 enter the integrator section 111. Therefore, when the light source section 110 is formed of a plurality of lamps and reflectors, the shapes and configurations of each lens array element of the first lenticular lens array 111A will be different than when the light source section is formed of a single lamp and reflector. In response thereto, comb polarization-separation prism arrays having mutually different arrangement directions may be utilized following the second lenticular lens array 111B of the polarization converter so that the incident light is used most efficiently.

Embodiment 2

The polarization converter and the projection-type display device using the same of Embodiment 2 have roughly the same configurations as those in Embodiment 1. The difference from Embodiment 1 is that the light source section 10 of Embodiment 2 consists of a single lamp 4 and a single parabolic mirror reflector 1. Since this lamp 4 is round, the light flux from the light source section 10 is large near the optical axis. Even if the light is incident onto the second lenticular lens array 11B after passing through the first lenticular lens array 11A so as to decrease illumination unevenness, the light flux remains large near the optical axis. Therefore, it is most effective to utilize the light flux at that region as much as possible.

Embodiment 2 is an example where the luminous flux from the light source section 10 is not evenly distributed. Thus, because of this light source 10, the shape of the second lenticular lens array 11B is different from that in Embodiment 1, and the configuration of the polarization converter 11C is also different. FIG. 6 shows the second lenticular lens array 211B relating to Embodiment 2, and FIG. 7(A) shows the polarization converter 211C relating to Embodiment 2.

The second lenticular lens array 211B, as shown in FIG. 6, includes three types of lens array elements 241, 242 and 243. At the center of the second lenticular lens array 211B near the optical axis, lens array elements 242 are arranged that are rectangular and have their longer sides parallel to the X-axis. Surrounding these, relatively small lens array elements 241 and 243 are arranged. Thus, the light near the optical axis having a large intensity is efficiently used.

Although the shape and configuration of the lens array elements of the first lenticular lens array of Embodiment 2 are not shown, each lens array element mutually has the same shape and size as that of the light modulator. Further, each lens array element of the first lenticular lens array and that of the second lenticular lens array 211B correspond in shape to each other, and each of the lens array elements 241, 242 and 243 of the second lenticular lens array 211B forms one light source image. Specifically, each lens array element of the first lenticular lens array carries out necessary decentering operations.

Due to these decentering operations, in FIG. 6, each horizontally long rectangular lens array element 242 of the second lenticular lens array 211B forms a light source image at a section of the exit surface thereof near the Y-axis, instead of the central section. Additionally, each horizontally long rectangular lens array element 243, arranged at the top and bottom sections of the lens array elements 242, forms a light source image at the center of the exit surface thereof. Moreover, each vertically long rectangular lens array element 241, arranged at the right and left sections of the lens array elements 242, forms a light source image at a section near to the X-axis, instead of the central section.

The polarization converter 211C is arranged after this second lenticular lens array 211B, and is constituted as shown in FIGS. 7(A) and 7(B). FIG. 7(A) is a configuration of this polarization converter 211C as seen from the projection section side, and FIG. 7(B) is a plan view, wherein FIG. 7(A) is seen from the bottom of the page.

This polarization converter 211C is configured to let the luminous fluxes, emitted from lens array elements 242 of the second lenticular lens array 211B, enter a central comb polarization-separation prism array 252. The luminous fluxes that are emitted from lens array elements 241, on the left and right sides of FIG. 6, enter comb polarization-separation prism arrays 251 at the left and right sides, respectively, as shown in FIG. 7(A). And, the luminous fluxes emitted from lens array elements 243 at the top and bottom of FIG. 6 enter the comb polarization-separation prism arrays 253 on the top and bottom, respectively. Additionally, in inverse proportion to the pitches of prism pairs constituting each comb polarization-separation prism array 251, 252 and 253, the thickness of each array in the optical axis direction varies. Thus, the comb polarization-separation prism array 252 is thicker than the comb polarization-separation prism array 251, which itself is thicker than the comb polarization-separation prism array 253.

Accordingly, luminous flux passing through lens array elements 242, enters the comb polarization-separation prism array 252 of the polarization converter 211C and is incident onto the polarizing beam splitter film 273, where the p-component is transmitted and the s-component reflected, thus being split into two luminous fluxes of different linear polarization. The s-component flux is then reflected by reflection film 274 so as to propagate in the same direction as the p-polarized flux. One of these linearly polarized fluxes is then incident onto half-wave plates 261 and is converted into the polarization of the other linearly polarized flux, so that a uniformly polarized flux is formed.

Additionally, the luminous fluxes emitted from each lens array element 243, enters the comb polarization-separation prism arrays 253 of the polarization converter 211C, and are incident onto the polarizing beam splitter films 275, where the p-component is transmitted and the s-component reflected, thus being split into two luminous fluxes of different linear polarization. The s-component flux is then reflected by reflection films 276 so as to propagate in the same direction as the p-polarized flux. One of these linearly polarized fluxes is then incident onto half-wave plates 263 and is converted into the polarization of the other linearly polarized flux, so that a uniformly polarized flux is formed. The light is reflected to the right direction on the page, parallel to the X-axis, in the comb polarization-separation prism array 253 at the top of FIG. 7(A), and is reflected to the left direction on the page, parallel to the X- axis, in the comb polarization-separation prism array 253 at the bottom of FIG. 7(A).

Moreover, the luminous fluxes emitted from each lens array element 241 enter the comb polarization-separation prism arrays 251 of the polarization converter 211C, and are split by the polarizing beam splitter films therein (not shown) into the luminous fluxes which are transmitted and the luminous fluxes which are reflected in the direction away from the X-axis, reflected by reflection films (not shown), and then converted to the other polarization by the half-wave plates rotating the direction of polarization by 90 degrees.

Specifically, the luminous fluxes passed by each lens array element 241, 242 and 243 enter the comb polarization-separation prism arrays 251, 252 and 253, respectively, wherein prism pairs are arranged in the longitudinal direction of each lens array element 241, 242 and 243. Thus, as explained by referring to FIGS. 5 in the general description of the embodiments, the ratio of areas relative to a circumscribing circle is large, and light may be transmitted efficiently.

Moreover, a light source image is ideally formed at the center of the shaded areas shown in FIGS. 5(A) and 5(B) for convenience. However, as in the case where light enters from lens array elements 241 to the comb polarization-separation prism arrays 251, even if a cross section is not divided at the center of an element, illumination efficiency would not decrease.

Accordingly, the polarization converter 211C is configured having at least two regions, each region including adjacent prisms arranged side-by-side in a row, the prisms supporting films that are arranged in pairs, each film pair including a polarizing beam splitter film and a reflection film, wherein the row of one region is oriented non-parallel to the row of another region. Preferably, the rows are substantially perpendicular to each other. Thus, a polarization converter having high efficiency of utilizing light, and which takes construction and assembly costs into consideration, may be provided.

Additionally, the polarization converter 211C of this embodiment effectively utilizes the luminous fluxes around the optical axis having a large quantity of incident light, and uses only the sections with a large quantity of light out of the light from each lens array element 241, 242 and 243 including the peripheries, so that more light will enter the beam splitter.

Embodiment 3

Figure 8:
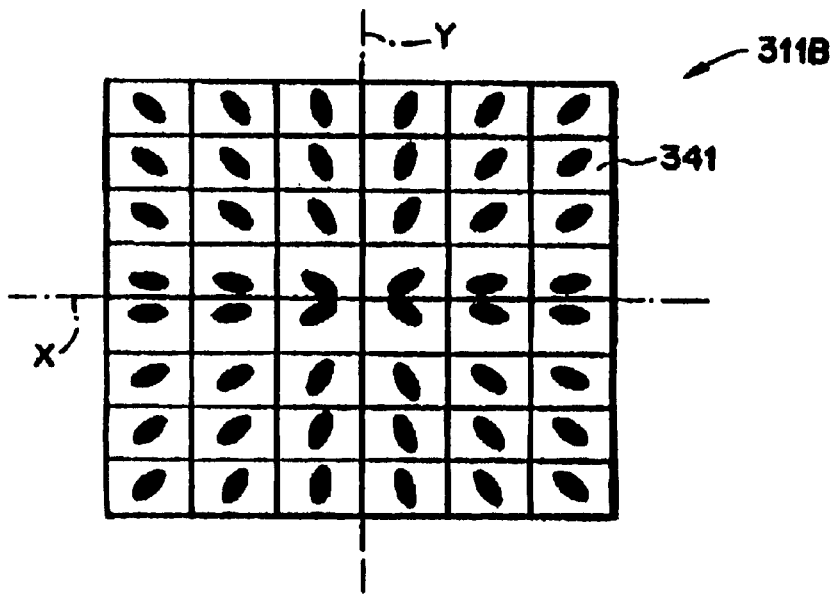
FIG. 8 shows the configuration of the second lenticular lens array of Embodiment 3.

The polarization converter and the projection-type display device using same of Embodiment 3 have roughly the same configurations as those in the above-described embodiments. The light source section 10 of Embodiment 3 includes a single lamp 4 having a large variation in light intensity distribution and a single reflector. Therefore, the light source images that are formed by the first lenticular lens array elements 11A (FIG. 2) all having the same shape and size, on the second lenticular lens array 11B formed according to this embodiment as lens array elements 341 all having the same shape and size as shown in FIG. 8, are radial ellipses with different orientations of the major axis of the ellipse. Generally, a lamp having a small variation of light intensity distribution (e.g., a light source with an extremely small lamp), forms almost circular light source images on the second lenticular lens array. However, if the illumination distribution of a light source is large (as a result of the lamp being large, as in Embodiment 3), the light source images become elliptical, as shown in FIG. 8.

Figure 9A:
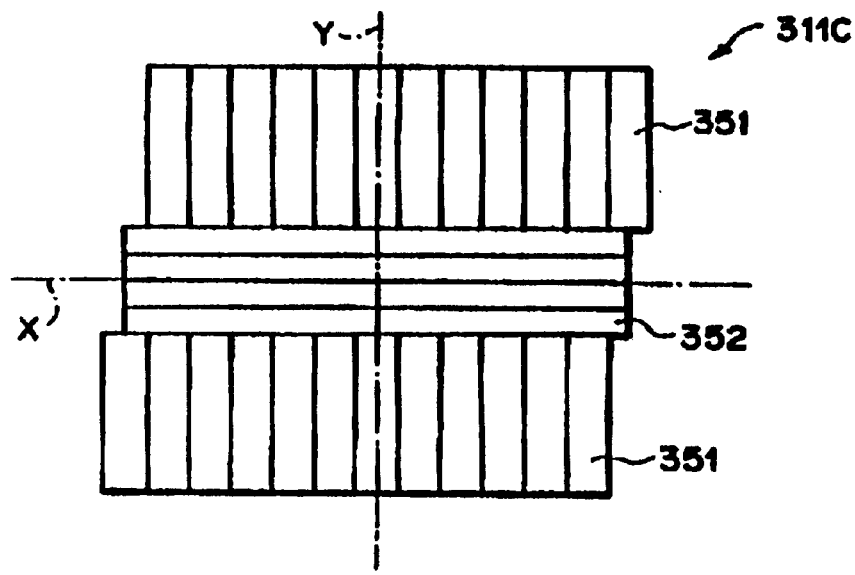
FIGS. 9(A) and 9(B) are top and side views, respectively, of the polarization converter of Embodiment 3.
Figure 9B:
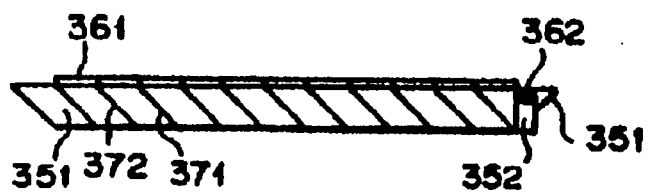
Figure 10A:
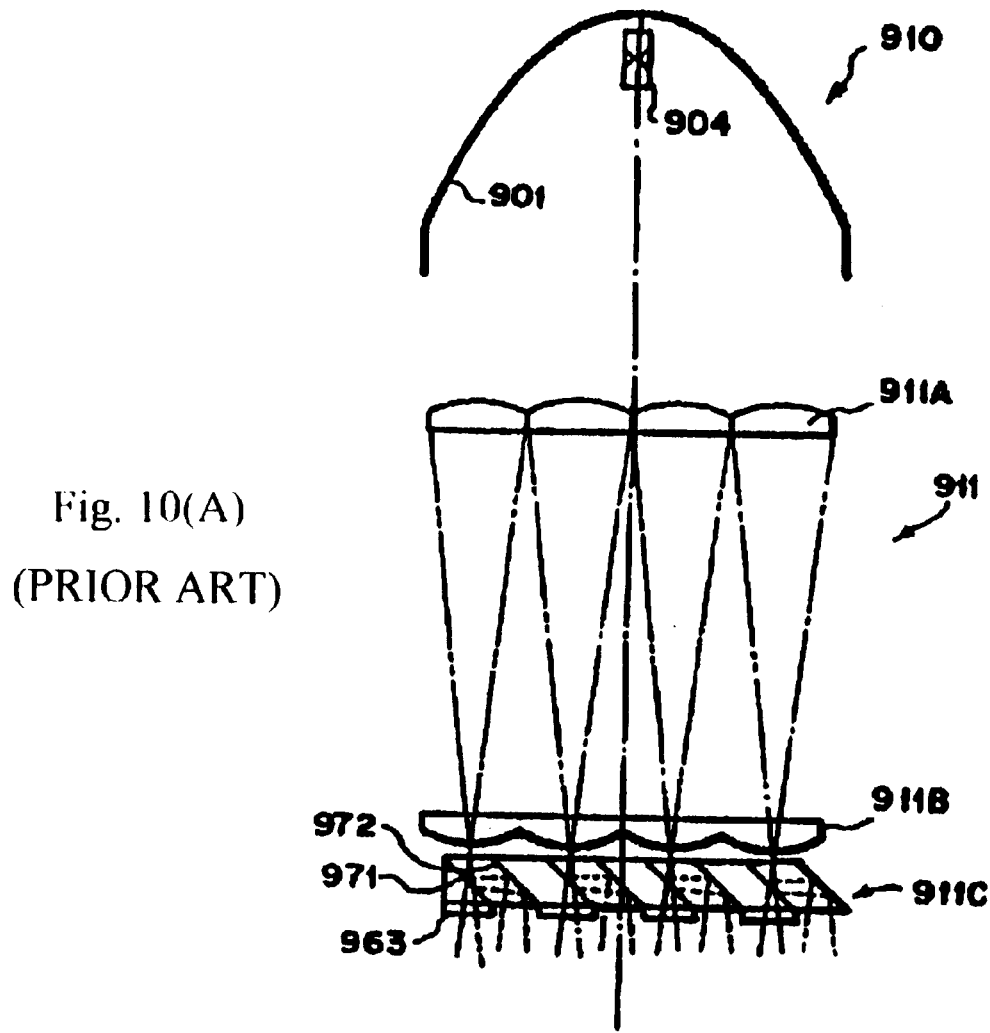
FIG. 10(A) is a side view of a portion of a prior art illumination optical system, namely, from the light source to the polarization converter.
Figure 10B:
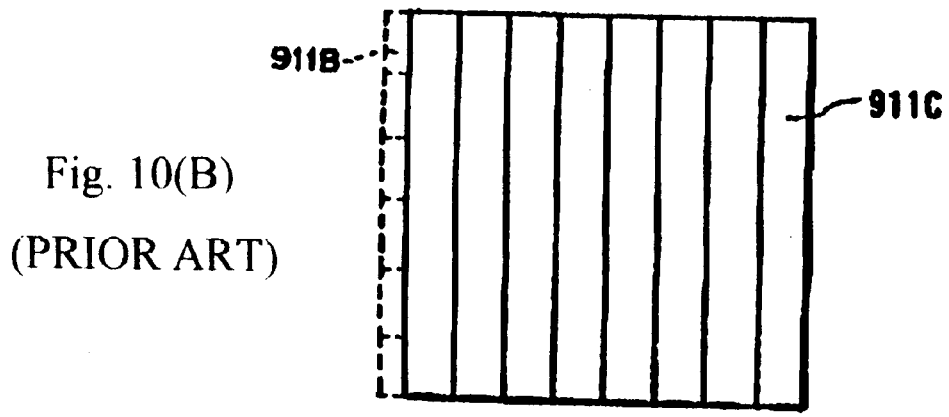
FIG. 10(B) shows the configuration illustrated in FIG. 10(A), but as viewed looking along the optical axis (i.e., from a position below 911C looking toward the light source)
Figure 11A:
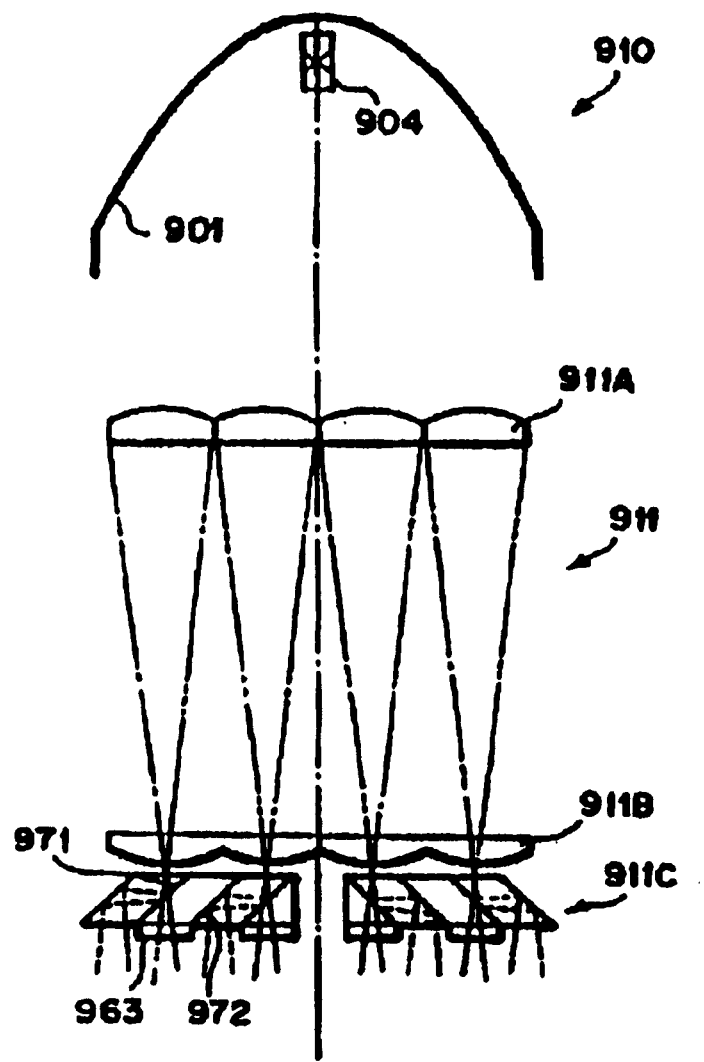
FIG. 11(A) is a side view of a portion of another prior art illumination optical system from the light source to the polarization converter.
Figure 11B:
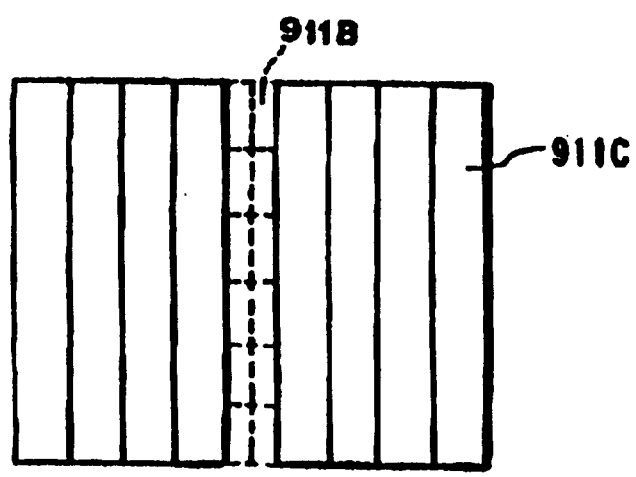
FIG. 11(B) shows the configuration illustrated in FIG. 11(A), but as viewed looking along the optical axis (i.e., from a position below 911C looking toward the light source).

A polarization converter 311C for this embodiment, as shown in FIGS. 9(A) and 9(B), is configured to be consistent with the configuration of the second lenticular lens array 311B. FIG. 9(A) is a view showing the configuration of this polarization converter 311C as viewed from a position on the optical axis from the side of a projection section, and FIG. 9(B) is a side view of the structure of FIG. 9(A), i.e., with the observer being on the Y-axis, at the bottom of the page of FIG. 9(A).

This polarization converter 311C is configured so as to let the luminous fluxes that pass through each lens array element 341 of the second lenticular lens array 311B nearest to the X-axis enter a comb polarization-separation prism array 352 and to let the luminous fluxes that are emitted from each of the other lens array elements 341, enter comb polarization-separation prism arrays 351 arranged on the top and bottom of the comb polarization-separation prism array 352 as shown in FIG. 9(A). Additionally, in inverse proportion to the pitch of prism pairs constituting each comb polarization-separation prism array 351 and 352, the comb polarization-separation prism arrays 351 are thicker than the comb polarization-separation prism arrays 352 in the direction of an optical axis, as shown in FIG. 9(B).

Accordingly, the luminous fluxes that are emitted from each lens array element nearest the X-axis among lens array elements 341 enter the comb polarization-separation prism array 352 of the polarization converter 311C, and are split by polarizing beam splitter films therein (not shown) into p-component luminous fluxes which are transmitted and s-component luminous fluxes which are reflected, then re-reflected by reflection films (not shown), and passed through half-wave plates 362 so as to be converted to a uniform polarization direction. Additionally, the luminous fluxes emitted from the remaining elements among lens array elements 341 enter the comb polarization-separation prism arrays 351 of the polarization converter 311C, and are incident onto the polarizing beam splitter film 371. Once again the p-component light is transmitted and the s-component light reflected. Reflection films 372 redirect the reflected, s-polarized component light, and half-wave plates 361 rotate one of the components 90 degrees (thereby converting one component to the other component, in the usual fashion) so that all the luminous flux is efficient made to have a single polarization. The light is reflected in a direction to the right on the page for the comb polarization-separation prism array 351 at the top of FIG. 9(A), and in a direction to the left on the page for the comb polarization-separation prism array 351 at the bottom of FIG. 9(A). In this way the luminous fluxes forming the elliptical light source images nearest the X-axis may be effectively input to the comb polarization-separation prism array 352, and the other luminous fluxes that pass through the other lens array elements 341 may be input from rectangular regions 351 that are longer in the Y-axis direction than in the X-axis direction, as shown in FIG. 9(A).

Therefore, the polarization converter 311C relating to Embodiment 3 can effectively use the light that is incident in elliptical light source images as shown in FIG. 8, and can efficiently convert said light to light having a single polarization.

For the highest efficiency of utilizing light, it is preferable to design the polarization converter 311C so as to be made of finer members and so as to correspond in shape to all the different elliptical light source images shown on the individual lens array elements 341. However, such members would be expensive, and the efficiency would decrease due to the precision of assembly required, as compared to instead using the polarization converter 311C as shown in FIGS. 9(A) and 9(B). Polarization converter 311C is configured in such a way that the comb polarization-separation prism arrays 351, 352 have different pitches, with their alignment directions being non-parallel. Preferably, the angle formed between the two rows of adjacent prisms is substantially 90 degrees. Thus, a polarization converter having high efficiency of utilizing light and taking costs and assembly precision into consideration, and a projection-type display device using the same, may be provided.

If the illumination distribution of the light source section is even farther from a circle than in this embodiment, it becomes nearly impossible to define an optimum configuration for the lenticular lens array and the polarization converter. When the light source images are nearly circular, it is more effective when the incident section to a polarization converter is as shown in FIG. 5(A). However, when the illumination distribution of a light source section is elliptical, with the major axis of the ellipse in the horizontal direction on the page, light entering from the shaded area of FIG. 5(A) to the polarization converter is no longer effective, and there is improvement in brightness in the image plane if the light enters as shown instead from the shaded area shown in FIG. 5(B). Even with such a light source section, however, the polarization converter of the present invention would be useful.

As explained above, according to the polarization converter of the present invention and a projection-type display device using the same, even if the shapes of the lens array elements of a second lenticular lens array are different, light is effectively utilized at those regions having a large amount of incident light. Furthermore, even if the shapes of lens array elements of the second lenticular lens array are the same but circular light source images are not formed due to the characteristics of the light source, the polarization converter of the present invention has a high efficiency in utilizing the light, and is relatively inexpensive and easy to construct.

The invention being thus described, it will be obvious that the same may be varied in many ways. For example, rather than the reflector being made of a parabolic mirror, other arrangements may be provided so long as the light that is emitted is substantially collimated. Further, although two separate lenticular lens arrays are used as for the integrator section in the above-mentioned embodiments, the integrator can instead be formed of a single lenticular lens array by omitting the second lenticular lens array, provided the light is sufficiently collimated. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A polarization converter having at least two regions, each region including adjacent prisms arranged side-by-side in a row, said prisms supporting films along said row, wherein the row of one region is oriented non-parallel to the row of another region, and further including a half-wave plate aligned to receive light exiting from every other of said adjacent prisms.

2. The polarization converter of claim 1, wherein the rows of said different regions form substantially a 90-degree angle.

3. The polarization converter of claim 2, in combination with a projection-type display device, said projection-type display device comprising:

a light source section wherein a single lamp is arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

4. The polarization converter of claim 2 in combination with a projection-type display device, said projection-type display device comprising:

a light source section wherein a plurality of lamps are arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

5. The polarization converter of claim 1, wherein the adjacent prisms of one region have a pitch that is different from the adjacent prisms of another region.

6. The polarization converter of claim 5, in combination with a projection-type display device, said projection-type display device comprising:

a light source section wherein a single lamp is arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

7. The polarization converter of claim 5 in combination with a projection-type display device, said projection-type display device comprising:

a light source section wherein a plurality of lamps are arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

8. The polarization converter of claim 1 in combination with a projection-type display device, said projection-type display device comprising:

a light source section wherein a single lamp is arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

9. The polarization converter of claim 1 in combination with a projection-type display device, said projection-type display device comprising:

a light source section wherein a plurality of lamps are arranged;

an integrator section having at least two integrator plates arranged sequentially in a light path, each integrator plate having a plurality of lens elements arranged in an array so as to produce a spatially even light flux emitted from said light source section;

a light modulator which modulates light emitted from the integrator section in response to predetermined image information; and a projection lens which projects optical images of light modulated by the light modulator onto a screen;

wherein said polarization converter is arranged, in relation to the two integrator plates of the integrator section, nearer the integrator plate which is closest to said light modulator.

* * * * *

UNITED STATES PATENT AND TRADEMARK OFFICE
CERTIFICATE OF CORRECTION

PATENT NO. : 6,337,759 B1
DATED : January 8, 2002
INVENTOR(S) : Chikara Yamamoto It is certified that error appears in the above-identified patent and that said Letters Patent is hereby corrected as shown below:

<u>Title page</u>,
Item [*], "Notice", change the patent term adjustment from "0 days" to -- 42 days --;

<u>Column 1</u>,
Line 62, change "projection-t ype" to -- projection-type --; and <u>Column 9</u>,
Line 35, change "one the" to -- one that --.

Signed and Sealed this

Twenty-fifth Day of June, 2002

Attest:

*Attesting Officer*

JAMES E. ROGAN
*Director of the United States Patent and Trademark Office*